Jan. 20, 1925.  M. GOLDBERG  1,523,415
ICE CREAM CONE DEVICE
Filed March 13, 1922   3 Sheets-Sheet 1
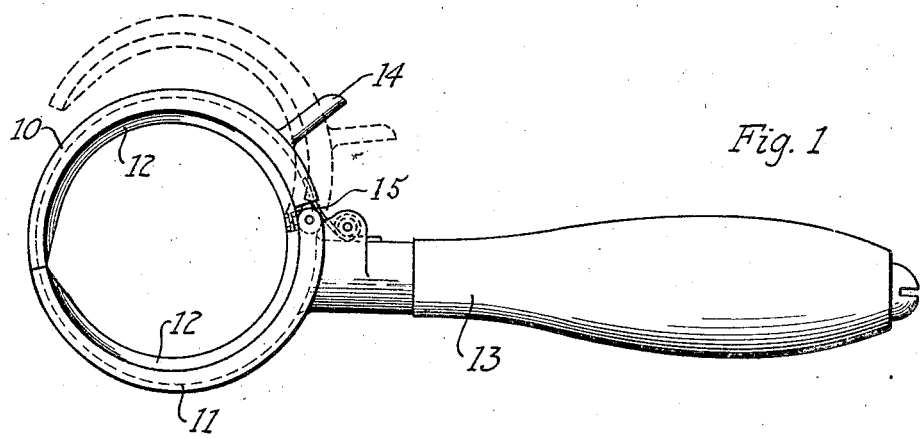
Fig. 1
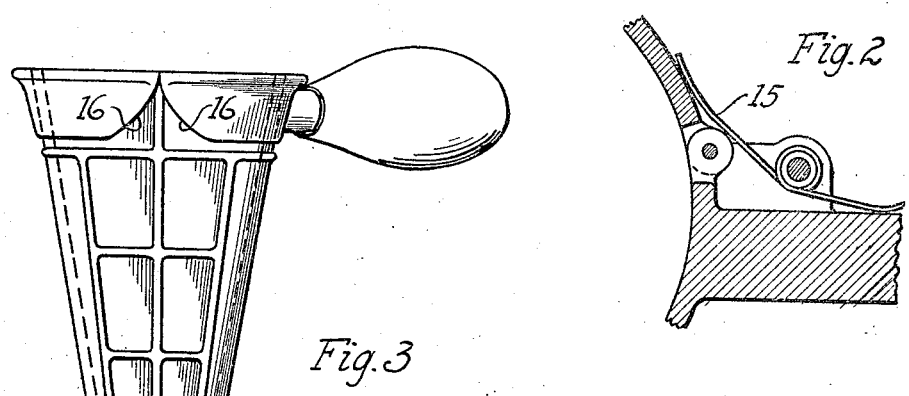
Fig. 3
Fig. 2
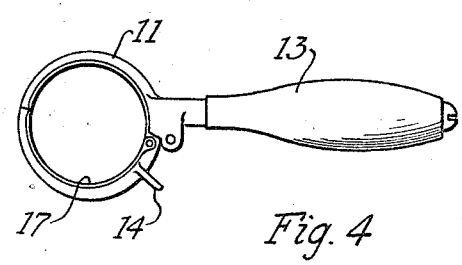
Fig. 4
INVENTOR:
Max Goldberg
By E. J. Andrews
Atty Jan. 20, 1925.

M. GOLDBERG

ICE CREAM CONE DEVICE

Filed March 13, 1922

1,523,415

3 Sheets-Sheet 2

INVENTOR:
Max Goldberg
By E J Andrews
Att'y

Jan. 20, 1925.

M. GOLDBERG 1,523,415

ICE CREAM CONE DEVICE

Filed March 13, 1922    3 Sheets-Sheet 3

INVENTOR:
Max Goldberg
By E. J. Andrews
Atty.

Patented Jan. 20, 1925.

1,523,415

UNITED STATES PATENT OFFICE.

MAX GOLDBERG, OF CHICAGO, ILLINOIS.

ICE-CREAM-CONE DEVICE.

Application filed March 13, 1922. Serial No. 543,354.

*To all whom it may concern:*

Be it known that I, MAX GOLDBERG, a citizen of the United States, residing at Chicago, in the county of Cook and State of Illinois, have invented certain new and useful Improvements in Ice-Cream-Cone Devices, of which the following is a specification.

This invention relates to ice-cream cone devices, and it has for its object the production of a suitable hand-out device so arranged as to protect the ice-cream cone from breakage when it is being filled, and also to prevent handling the cone when it is being filled and when it is being handed to the customer. In filling ice-cream cones with ice-cream it sometimes happens that the upper edge of the cone is broken by the ice-cream as it is being forced into the cone, and this is particularly likely to happen if the edge of the cone should be slightly cracked. My invention contemplates this and has for its object means for preventing such fracturing of the cones by means of a clamp which when closed snugly surrounds the upper edge of the cone. This clamp also provides means for holding the cone without its coming in contact with the hand when the cone is being filled, and also when it is being handed out to the customer.

Figure 5:
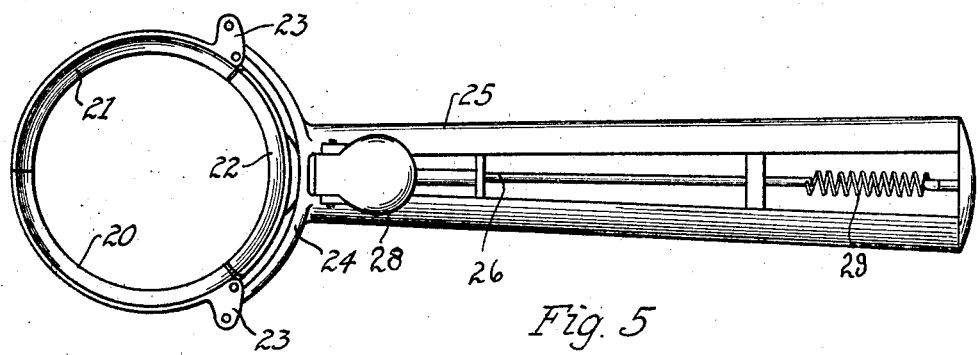
Figure 6:
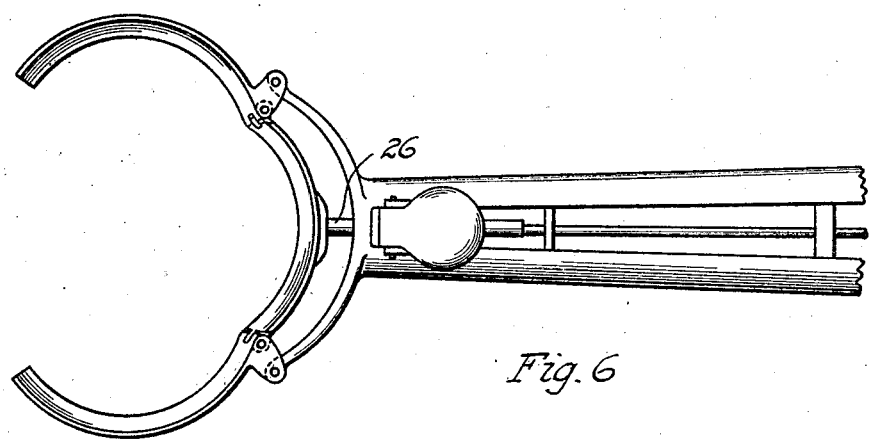
Figure 7:
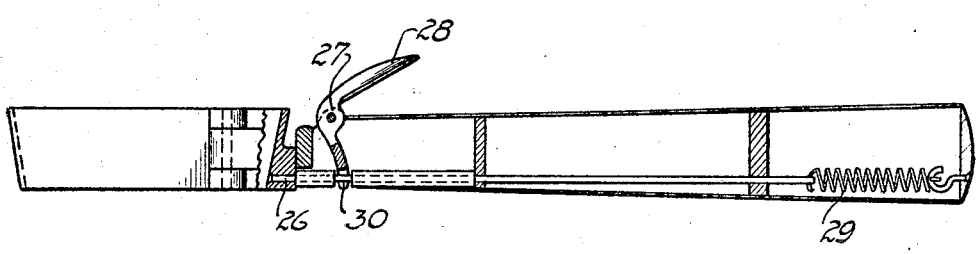
Figure 8:
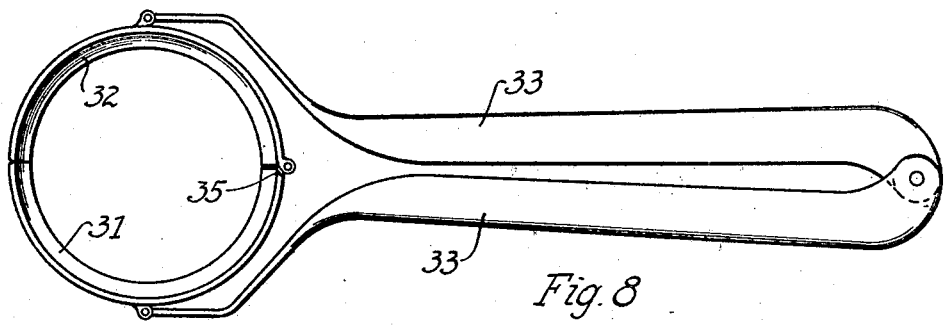
Figure 9:
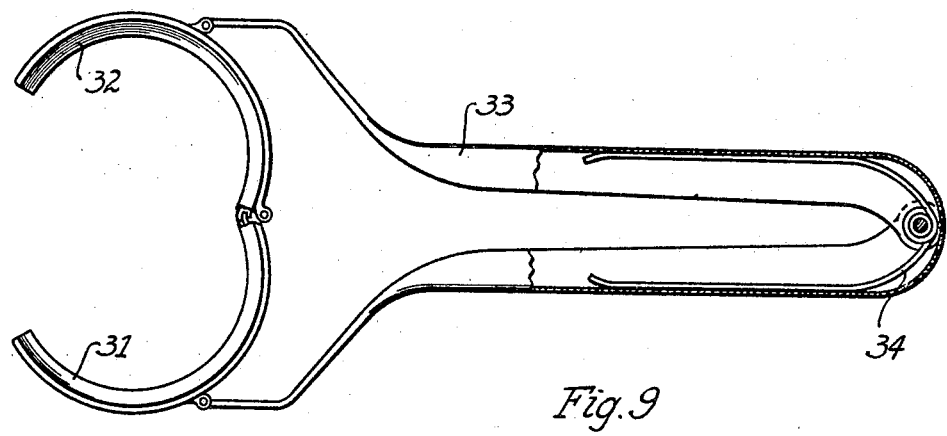

Of the accompanying drawings Fig. 1 is a plan view of my hand-out device shown closed but with dotted lines indicating the open position; Fig. 2 is an enlarged fragmental sectional view of the pivoted portion of the device; Fig. 3 shows the hand-out device encircling the ice-cream cone; Fig. 4 is a reduced inverted view of the device; Fig. 5 is a plan view of a modified form of hand-out; Fig. 6 is a plan view of the modified form when open; Fig. 7 is a central longitudinal sectional view of the device shown in Fig. 5; Fig. 8 is a plan view of a further modification with the device closed; and Fig. 9 is a central sectional view of the modified form of Fig. 8, showing the device open.

The hand-out device comprises a pair of jaws 10 and 11, so arranged as to be conveniently opened and closed. These jaws are curved and when closed they form together a conical ring as the inner surfaces 12 converge downwardly so as to form a conical surface which conforms to the conical outer surface of the ordinary ice-cream cones. The size of the jaws may be made suitable to hold any desired size of cones. The device is provided with a suitable handle 13 and with suitable means for opening or closing the jaws with the hand which holds the handle. The device shown in Fig. 1 has the jaw 11 fixed to the handle and the jaw 10 is pivoted thereto; and fixed to the jaw 10 is a thumb-piece 14 so arranged that the operator can conveniently hold the handle in his left hand and press towards the handle on the thumb-piece 14, thereby turning the jaw 10 away from the jaw 11. A spring 15 resiliently holds the jaw 10 in its closed position, so that when the thumb-piece is released the jaws will be brought together.

In use the operator takes the hand-out in his left hand, and opens the jaw with his thumb, places the open jaws over the upper end of the ice-cream cone, and then releases the thumb so that the jaws come together and clasp the cone, as indicated in Fig. 3. The inner surfaces of the jaws, thus fitting snugly around the upper edge of the cone, prevent breakage thereof, due to the pressing outwardly of the ice-cream, as the cone is being filled. When the cone is filled the operator passes the cone to the customer and then releases it by pressing inwardly on the thumb-piece.

In order to more conveniently remove the cone from the hand-out the lower corners 16 of the adjacent ends of the jaws are materially rounded, as indicated. This allows the cone to be tipped somewhat as it is being filled and thus prevents any undue sticking of the cone to the jaws. When the cone is filled with ice-cream the operator frequently scrapes across the edge of the cone with the spoon or other filler, and breakage in that manner is also prevented by the holder; and to prevent the jaw 10 from being opened when scraped the operator may press against the jaw or the thumb-piece 14 with his thumb.

If it is desired to use the hand-out for a smaller size cone, if desired the hand-out may be inverted, so that the smaller end 17 is upward, and the cone held in this manner, and then the thumb-piece 14 may be operated by the first finger of the operator. When held in this manner the scraping of the top of the cone has no tendency to open the jaws as the scraping then occurs against the jaw 11 which is fixed to the handle 13.

In the modified form, indicated by Figs. 5, 6, 7, the jaws 20 and 21 are each pivoted to a tapering curved band 22, and the shape of each piece is such that when closed the jaws and the band form a conical ring with its inner surface conforming to the outer surface of the ice-cream cone. Fixed to each of the jaws 20 and 21 are lugs 23 which are pivoted to a yoke 24 fixed to the handle 25. This arrangement is such that by pressing outwardly on the central portion of the piece 22 the jaws will be opened. This operation may be performed in any suitable manner; but I prefer to use a rod 26 which is connected to the center piece 22. The rod is slidably mounted in the handle and may be forced outwardly therefrom by means of a lever 27, having the thumb operating piece 28 fixed thereto. The inner end of the lever is pivotally connected with the rod 26 in any suitable manner such as by means of the fork 30, on the end of the lever rod. A spring 29 withdraws the rod inwardly, and thus the piece 22, when the thumb-piece 28 is released and thus closes the jaws.

The modified forms indicated in Figs. 8 and 9 differ from the other forms in that the spring actuating means tends to open the jaws instead of closing them, and, hence, the operator by the pressure of his hand closes the jaws and is able to hold them closed as tightly as he pleases, thus preventing any tendency of the manipulations to open the jaws inadvertently. This modified form comprises a pair of jaws 31 and 32, each pivoted at its central portion to an arm 33. The two arms at their outer ends are pivoted together, and a spring 34, encircling the pivot, tends at all times to push the arms apart; and, as the inner ends of the jaws are pivoted together by the pivot 35, when the arms are forced apart by the spring the jaws will be forced open.

This hand-out not only prevents breakage of the cones, but it enables slightly cracked cones to be used; and it provides sanitary means for handling the cones, and favorably impresses the consumer. Any suitable rust proof material may be used in making the device, such as aluminum.

I claim as my invention:

1. An ice-cream cone hand-out comprising a pair of curved jaws a pivot connecting the ends of said jaws, resilient means tending to hold said jaws closed with their other ends together, and means for forcing said jaws apart.

2. An ice-cream cone hand-out comprising a pair of curved jaws with their ends pivotally connected, resilient means tending to hold said jaws closed with their ends together, and means for forcing said jaws apart, the combined inner surface of the jaws when closed being conical.

3. An ice-cream cone hand-out comprising a pair of curved jaws with their ends pivotally connected, resilient means tending to hold said jaws closed with their ends together, means for forcing said jaws apart, and a handle rigidly fixed to one of said jaws.

4. An ice-cream cone hand-out comprising a pair of curved jaws with their ends pivotally connected, resilient means tending to hold said jaws closed with their other ends together, means for forcing said jaws apart, a handle rigidly fixed to one of said jaws, and said forcing means comprising a thumb-piece rigidly fixed to the other jaw.

5. An ice-cream cone hand-out comprising a pair of curved jaws with their ends pivotally connected, resilient means tending to hold said jaws closed with their ends together, and means for forcing said jaws apart, the combined inner surfaces of the jaws when closed being conical, the lower adjacent corners of the free end of the jaws being materially rounded.

In testimony whereof, I hereunto set my hand.

MAX GOLDBERG.